(12) United States Patent
Rosaen (10) Patent No.: US 7,780,335 B2
(45) Date of Patent: *Aug. 24, 2010

(54) WATER CONTROL APPARATUS

(76) Inventor: Lars Rosaen, 46980 N. Territorial Rd., Plymouth, MI (US) 48170

( * ) Notice: Subject to any disclaimer, the term of this patent is extended or adjusted under 35 U.S.C. 154(b) by 0 days.

This patent is subject to a terminal disclaimer.

(21) Appl. No.: 12/437,806

(22) Filed: May 8, 2009

(65) Prior Publication Data
US 2009/0231949 A1 Sep. 17, 2009

Related U.S. Application Data (63) Continuation of application No. 11/876,491, filed on Oct. 22, 2007, now Pat. No. 7,530,728.

(60) Provisional application No. 60/862,672, filed on Oct. 24, 2006.

(51) Int. Cl.
*B28C 5/18* (2006.01)
(52) U.S. Cl. .......................... 366/10; 366/17
(58) Field of Classification Search ............ 366/17, 366/3, 10, 30, 40; 137/101.19
See application file for complete search history.

(56) References Cited

U.S. PATENT DOCUMENTS

| | | | | |
|---|---|---|---|---|
| 2,413,488 | A * | 12/1946 | Draeger | .......... 366/40 |
| 2,537,585 | A * | 1/1951 | Hilkemeier | ............ 366/40 |
| 3,135,493 | A | 6/1964 | Gizeski | |
| 3,474,829 | A | 10/1969 | Scheineman | |
| 3,877,715 | A | 4/1975 | Thayer et al. | |
| 4,213,976 | A * | 7/1980 | Loeffler et al. | ............ 514/144 |
| 4,290,442 | A * | 9/1981 | Shaffer | .......... 137/112 |
| 4,544,275 | A * | 10/1985 | Hudelmaier | ............ 366/30 |
| 4,842,005 | A | 6/1989 | Hope et al. | |
| 5,605,173 | A * | 2/1997 | Arnaud | .......... 137/7 |
| 5,624,182 | A | 4/1997 | Dearing, Sr. et al. | |
| 5,713,663 | A * | 2/1998 | Zandberg et al. | ............ 366/8 |
| 5,752,768 | A | 5/1998 | Assh | |
| 5,775,803 | A | 7/1998 | Montgomery et al. | |
| 5,908,240 | A | 6/1999 | Hood | |
| 6,484,079 | B2 | 11/2002 | Buckelew et al. | |
| 6,611,755 | B1 * | 8/2003 | Coffee et al. | ............ 701/213 |
| 6,966,687 | B1 | 11/2005 | Elefsrud | |
| 7,502,665 | B2 * | 3/2009 | Giles et al. | ............ 700/241 |
| 7,530,728 | B2 * | 5/2009 | Rosaen | .......... 366/17 |
| 2003/0202418 | A1 * | 10/2003 | Scartezina | ............ 366/44 |
| 2007/0064518 | A1 | 3/2007 | Goff et al. | |
| 2009/0088924 | A1 * | 4/2009 | Coffee et al. | ............ 701/33 |

* cited by examiner

*Primary Examiner*—Tony G Soohoo
(74) *Attorney, Agent, or Firm*—Gifford, Krass, Sprinkle, Anderson & Citkowski, P.C.

(57) ABSTRACT

An embodiment for a water control apparatus is disclosed that may be used with a concrete mixing assembly. The apparatus may include flowmeter unit and a normally closed valve unit. The normally closed valve unit may be in fluid communication with, and removably connected to, the flowmeter unit. A control unit may be provide that may monitor the flowmeter unit and electronically control the opening of the normally closed valve unit. A switch may be also provided for that may electrically communicate with the control unit to. The activation of the switch being operable to cause the normally closed valve to open and result in the flow of water into a concrete mixing drum that is in fluid communication with the normally closed valve.

17 Claims, 7 Drawing Sheets

WATER CONTROL APPARATUS

REFERENCE TO RELATED APPLICATIONS

The present application is a continuation application of U.S. patent application Ser. No. 11/876,491, filed Oct. 22, 2007, which matured into U.S. Pat. No. 7,530,728, which claims priority from U.S. Provisional Application No. 60/862,672, filed on Oct. 24, 2006, the disclosure of which is incorporated by reference herein.

FIELD OF THE INVENTION

Described herein is an embodiment for a water control apparatus that may be used in connection with a commercial mixing vehicle (e.g., a concrete mixer truck). More specifically, described herein is a water control assembly that may operate to monitor water volume usage, track operator use, automatically control water use and transmit status data to a remote location, alone or in combination with a concrete mixer truck.

REFERENCE TO RELATED ART

Ready-mix concrete used in construction applications may typically be prepared at a batch plant and then transported by truck in a rotating drum to a job site. As the truck travels to a job site the curing process for the concrete is underway. Therefore, it may be necessary for the driver (during travel or when at the job site) to add extra water so that the concrete maintains sufficient fluidity for pouring. However, this extra water may reduce the strength of the resulting concrete, or (if to much water is added) even ruin the load. Accordingly, it would be advantageous to have a system that may accurately measure/indicate the amount of water being added to mix (i.e., the slump) to ensure that the mix is within requisite water-cement ratios (WCM).

When preparing the concrete batch, modern mixing vehicles may use a manually operable valve arrangement that permits operator to fill the mixing drum with the slump. These manual valve arrangements may include flow meters that indicate the amount of water being added to the mix. However, as mentioned above, these same mixing vehicles may also include a manually operable assembly that permits the vehicle operator to add water to the slump while in route. Specifically, the vehicles may include a lever (or the like) in the vehicle cab that the operator may actuate to cause water to flow from a vehicle mounted tank of pressurized water and into the mix. The water added in route (or at a job site) by the operator may go through the flow meter. However, when the flow meter is positioned outside the vehicle cabin, the operator has no means of learning exactly how much water he or she is being added in route. Further, the currently available systems may also allow the operator to "crack" the valve open just enough to allow water to flow into the mix, but at a pressure or flow rate that is to low to be detected by the flow meter (i.e, less than about 5 gallons per minute). Therefore, it may be possible for the operator to add water to the slump in a manner that is not detected by the flow meter.

Accordingly, it would be advantageous to have a water control system that allows better control and monitoring of the addition of water to the mix during all stages of production and delivery. It would also be advantageous to have a system whereby the stages of a mixing job could be tracked and reported to a remote location, such as a central tracking station. Indeed, such as system would address a long felt need in the industry for a reliable means of monitoring and controlling water use, and the use of equipment such as a mixer truck.

SUMMARY OF THE INVENTION

A water control apparatus that may be used with a commercial mixing vehicle may include a flowmeter unit in fluid communication with a water source, an (optional) normally open valve unit, and a normally closed valve unit. The normally open valve unit may be removably connected to the flowmeter unit. The normally closed valve unit may likewise be removably connected to the normally open valve unit. Alternatively, the normally closed valve unit may be removably connected to the flowmeter unit, or to a conduit (not shown) positioned between the flowmeter unit 12 and the normally closed valve unit. The valve units may each include a power-actuated valve that may be actuated in response to commands from a control unit that may be controlled by a switch or like device.

In operation, for example with a mixer truck, the normally open value unit may have a hose (or the like) and spray nozzle attached so as to permit a user to wash out the truck and mixing equipment. A second hose or conduit may also be provide that is connected at one end to the normally closed value unit and that terminates in or proximate to the mixer drum of the truck. Water may, therefore, be communicated from a source (e.g., a fixed water tank, truck mounted drum, etc.) to the flowmeter unit where the rate and/or volume of the water passing through the unit may be measured. Such measurements may be indicated on a display associated with the switching device. Water passing though the flowmeter unit may next pass through the normally open valve unit and then on to the normally closed value unit.

Actuation of the switching device by a user may result in the control unit causing the valve of the normally open valve unit to close, and the valve of the normally closed valve unit to open. Alternatively, the valves may be automatically actuated as just described by the control unit using on board software and/or hardware designed to cause water to be added at predetermined times or following predetermined events. Opening of the valve of the normally closed valve unit may thus cause an amount of water to be easily communicated from the water source and into the mixer drum of the mixer truck. Further, because the power-actuated valves of the valve units are always either full open, or full closed, the flow rate of water through the flowmeter unit is maximized. Users of the water control apparatus are also prevented from manually "cracking" a valve open. Therefore, the accuracy of water rate/volume measurements may be significantly increased.

BRIEF DESCRIPTION OF THE DRAWINGS

Reference will now be made to the attached figures wherein like reference numerals refer to like parts throughout and wherein:

FIG. 6 is a perspective, partially exploded top and side view of the embodiment of a water control apparatus of FIG. 2.

DETAILED DESCRIPTION OF THE INVENTION

Referring now to FIGS. 1 through 7, a water control apparatus 10 that may be used with a commercial mixing vehicle 100 may include a flowmeter unit 12 in fluid communication with a water source 102, an (optional) normally open valve unit 14, and a normally closed valve unit 16. The normally open valve unit 14 may be removably connected to the flowmeter unit 12. The normally closed valve unit 16 may likewise be removably connected to the normally open valve unit 14. Alternatively, the normally closed valve 16 unit may be removably connected to the flowmeter unit 12, or to a conduit (not shown) positioned between the flowmeter unit 12 and the normally closed valve unit 16. Each of the units 12, 14, 16 may have a molded body formed using a variety of commercial known methods. The valve units 14, 16 may each include a power-actuated valve 18, 20. Specifically, valves 16, 18 may each be a commercially available power-actuated valve may each be a solenoid 18', 20' controlled valve.

Further, each valve 18, 20 may be actuated in response to commands from a control unit 22 that may be remotely actuated by a switching device 24 or the like.

Figure 5:
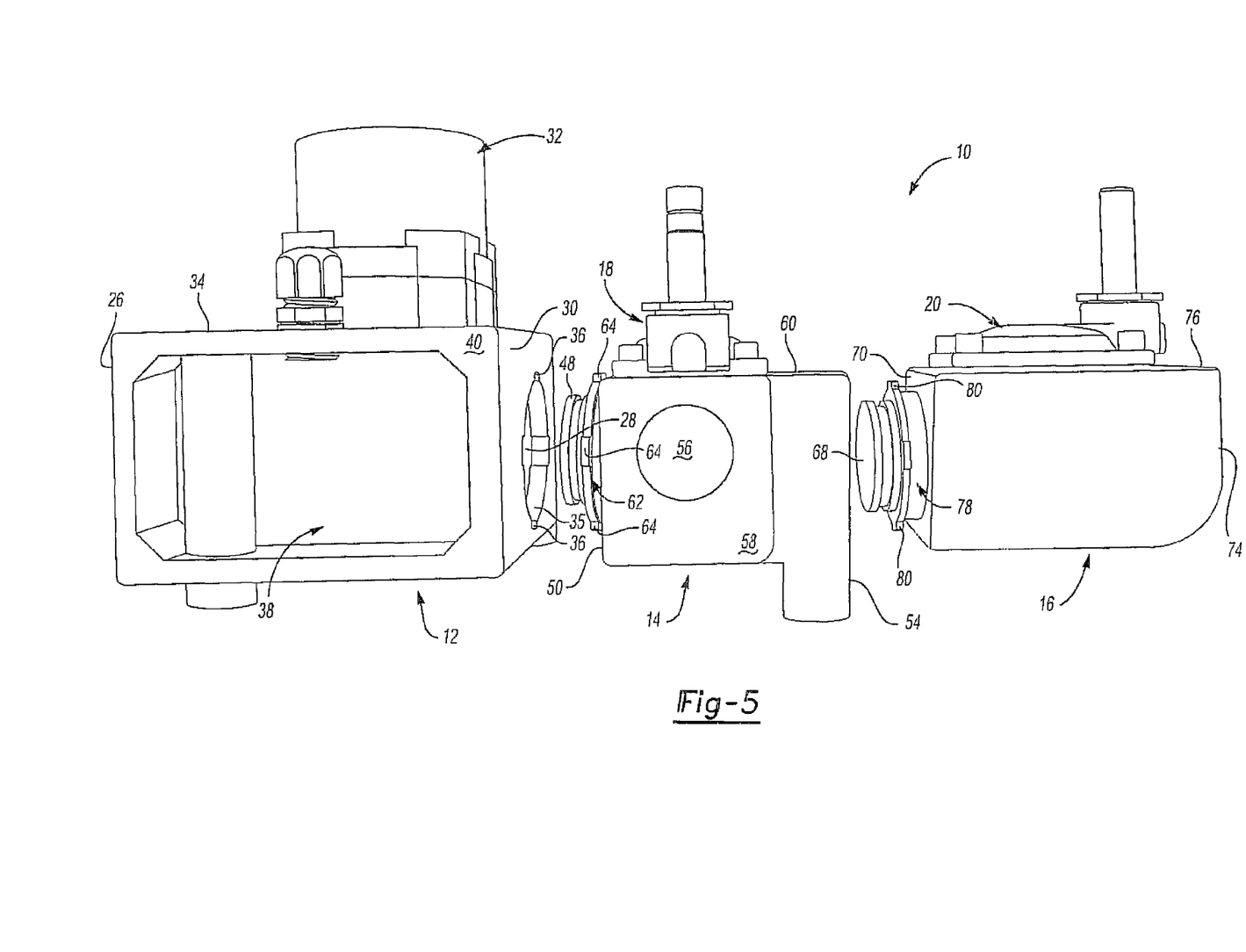
FIG. 5 is a perspective, partially exploded side view of the embodiment of a water control apparatus of FIG. 2.

Referring now to FIGS. 2 through 7, the flowmeter unit 12 of the water control apparatus 10 may include a fluid conduit that extends through the unit 12 and defines a water intake opening (not shown) on one side 26 of the unit 12 and a water out flow opening 28 on the opposite side 30 of the unit 12. A flowmeter 32 that communicates with the fluid conduit and is capable of measuring low psi flow rates may be mounted a face 34 of the unit 12. For example, the flowmeter 32 may be a COOLPOINT® flowmeter vortex shedding type meter manufactured by Universal Flow Monitors of Hazel Park, Mich. The intake opening (not shown) of the unit 12 may be threaded or include other manner of connect necessary to secure the unit 12 to a water conduit or hose. However, as best shown in FIGS. 5 and 6, the water out flow opening 28 may include a female connector 35 having series of grooves 36 that, as will be discussed below, permit the normally open valve unit 14 or the normally open valve unit 16 to be removably secured to the flowmeter unit 12.

Referring now to FIGS. 2 through 6, a recess 38 may be defined in another face 40 of the flowmeter unit 12 may into which may be mounted the control unit 22. The control unit 22 may be electrically connected to, and include hardware and/or software that permits the control of each valve 18, 20, and the monitoring of flowmeter 32. Further, the control unit 22 may be electrically connected to the switching device 24 such the control unit 22 may be activated by triggering the switching device 24. Therefore, as mentioned above, when activated via the switching device 24 the control unit 22 may operate to cause the valve 18 of the normally open valve 16 to close, and the valve of the normally closed valve to open. Additionally, or alternatively, the control unit 22 may operate to cause the normally closed valve to automatically open and close to thereby allow a predetermined amount of water to flow into the concrete mixing drum. Accordingly, it will be appreciated that the control unit 22 may be programmed to maintain the concrete in the drum within a predetermined water-cement ratio over a predetermined time. The control unit 22 may also include a global positioning system (GPS) receiver 27 and a radio transmitter 29 for transmitting data (e.g., flow meter information, valve open/close status) to a remote station.

Figure 1:
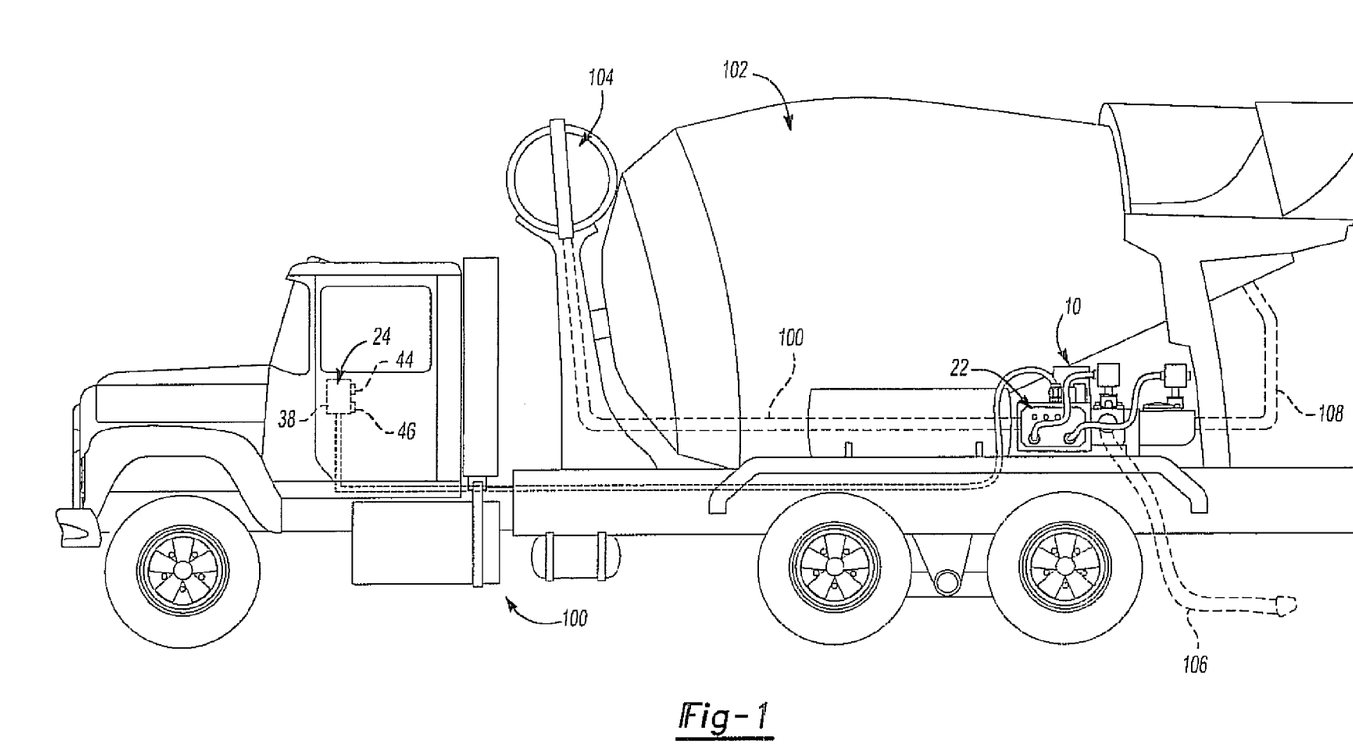
FIG. 1 is a planar environment side view showing an embodiment of a water control apparatus mounted on a mix truck, the apparatus being depicted as larger than normal for purposes of clarity.
Figure 2:
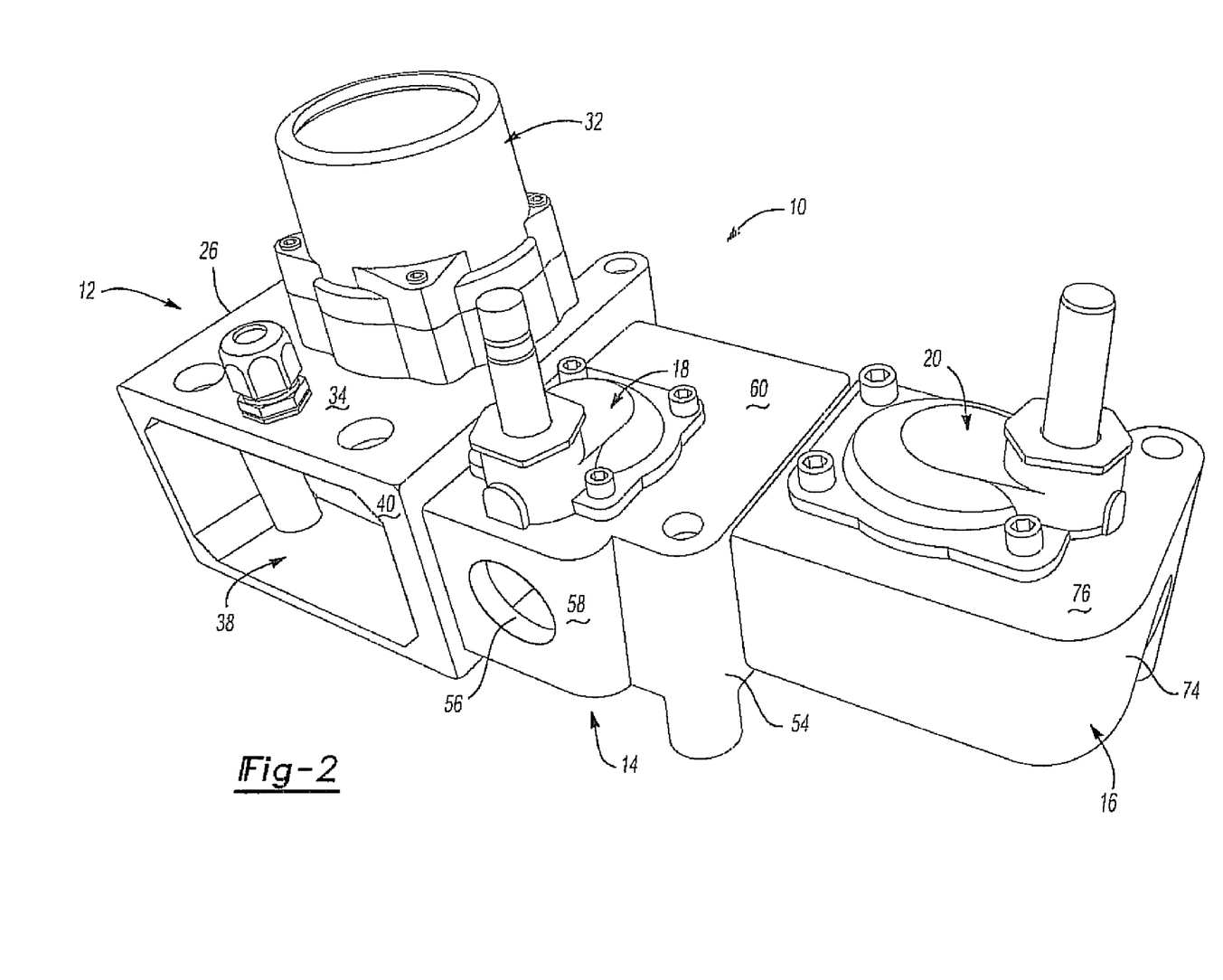
FIG. 2 is a perspective side view of a an embodiment of a water control apparatus.
Figure 3:
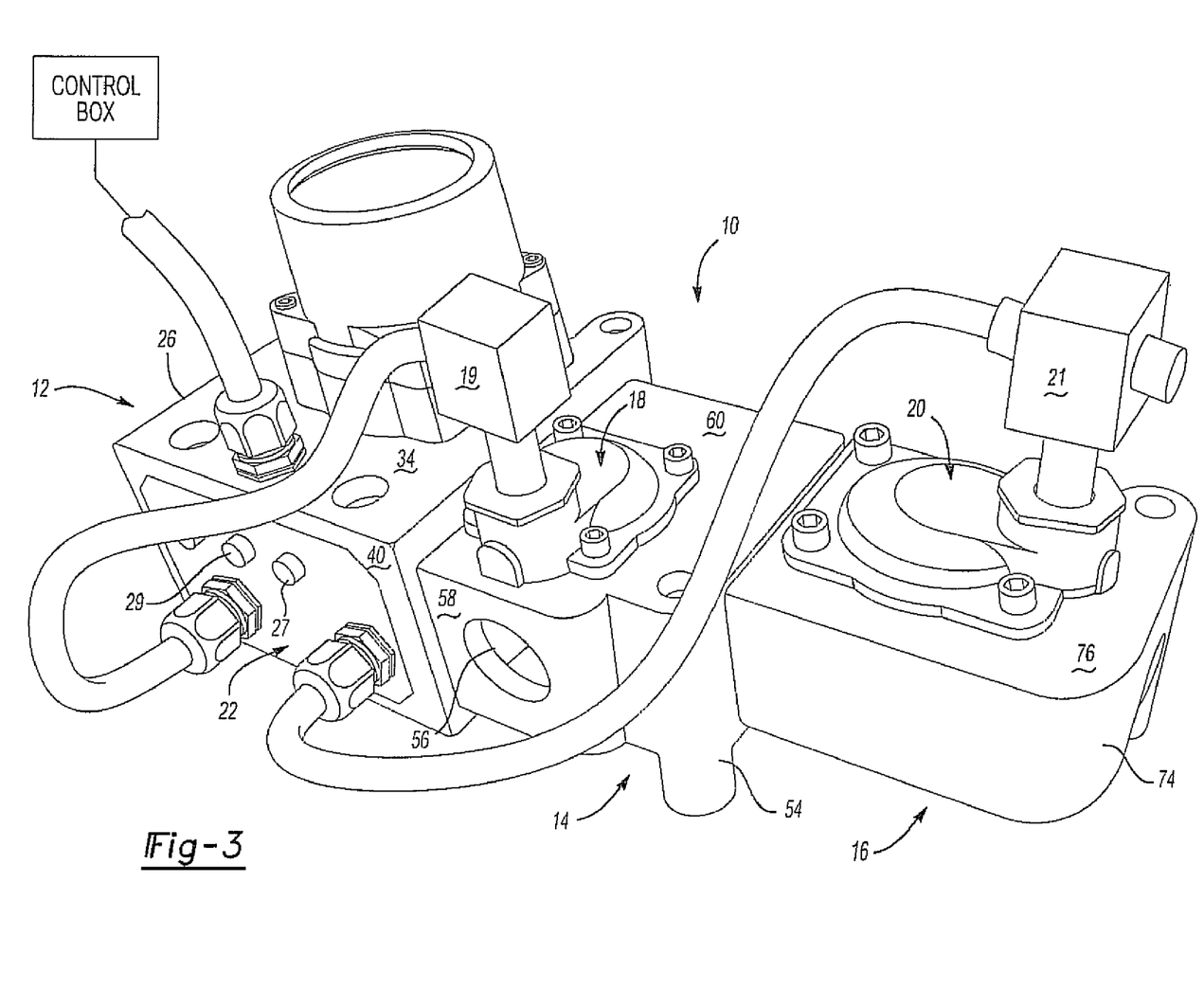
FIG. 3 is a perspective side view of the embodiment of a water control apparatus of FIG. 2 showing solenoids (or the like) mounted on the apparatus valves and a control unit.
Figure 4:
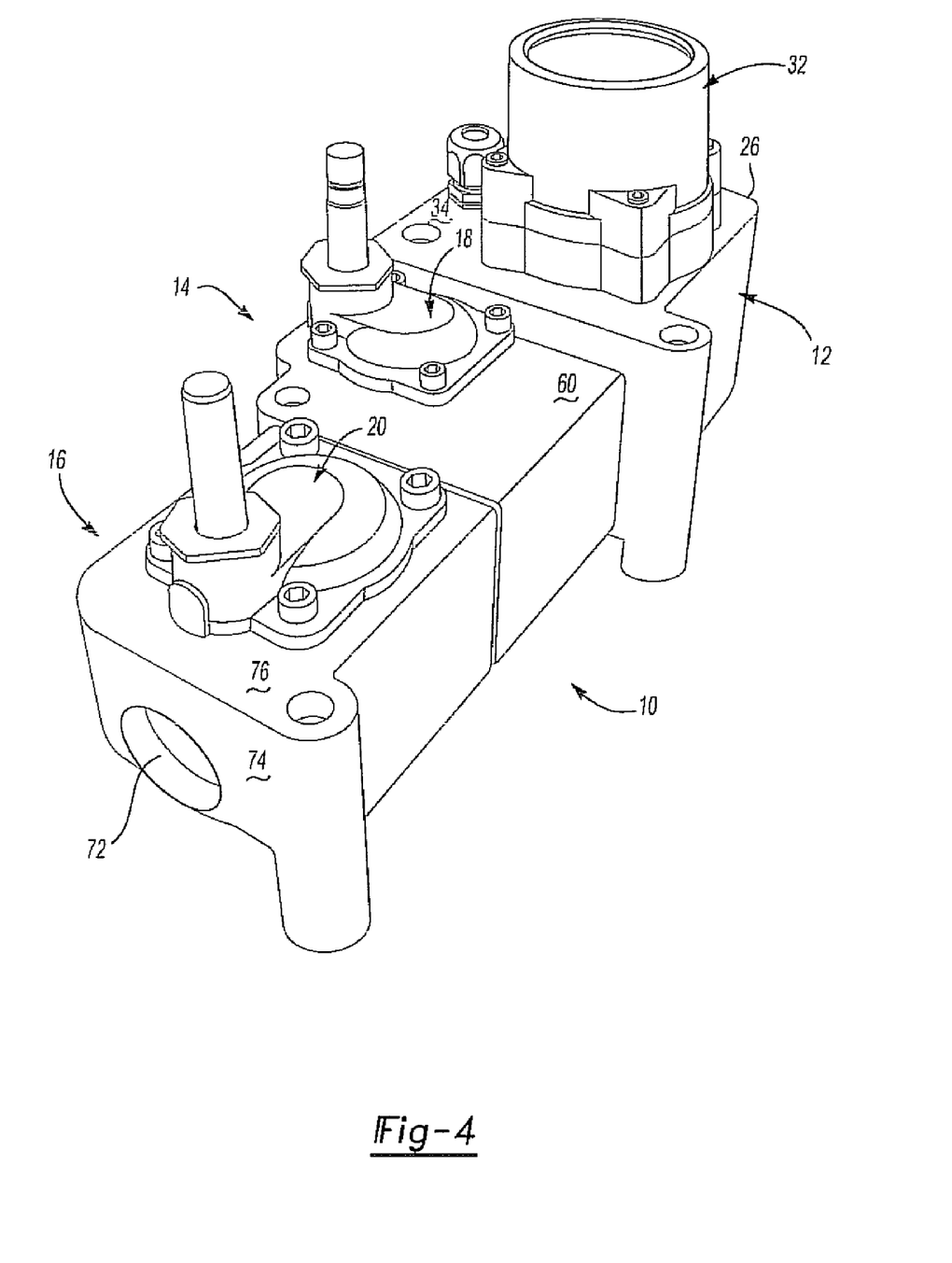
FIG. 4 is a perspective end view of the embodiment of a water control apparatus of FIG. 2.

Referring now to FIGS. 1 and 3, the switching device 24 may include a housing 38 having a toggle switch 44 and display 46 and known electronics (not shown). As shown, the switch device is positioned with the cabin of a mixer truck 100. However, it will be appreciated that one or more switching devices 24 may be positioned in a variety of locations on the truck 100 or integrated into the control unit 22.

Referring now to FIGS. 1 and 3, as discussed above, activation of the toggle switch 44 may operate to transmit a command to the control unit 22. The toggle switch 44 may be biased into an off position such that the valve 18 of the normally open valve unit 14 and the valve 20 of the normally closed valve unit 16 remain, respectively, in an open or closed orientation. The display 46 may function to indicate the volume of fluid/water flowing through the flowmeter unit 12 as measured by the flowmeter 32.

Referring now to FIGS. 2 through 6, the normally open valve unit 14 may include a three-way fluid (or branching) conduit may extends through the unit 14. Specifically, the conduit may define a water intake opening 48 on one side 50 of the unit 14, a first water out flow opening 52 on the opposite side 54 of the unit 14, and a second water out flow opening 56 in a face 58 of the unit 14. The power actuated valve 16 may communicate with the three-way fluid conduit and may be mounted a face 60 of the unit 14.

As best shown in FIGS. 5 and 6, the water intake opening 48 may include a male connector 62 having a plurality of tongues 64. As such, it will be appreciated that the male connector 62 of the valve unit 14 may be removably fitted to the female connector 35 of the flowmeter unit 12. The first water out flow opening 52 of the normally open valve unit 14 may also define a female connector 66 similar to the female connector 35 of the flowmeter unit 12. The second water out flow opening 56 may be closed off by a removable knock-out portion (not shown). Alternatively, the opening 56 may be threaded or include a fitting or connector such that a hose or the like may have connected valve unit 14 at the opening 56.

Referring now to FIGS. 2 through 7, the normally closed open valve unit 16 may also include a conduit may extend through the unit 16. Specifically, the conduit may define a water intake opening 68 on one side 70 of the unit 16 and a water out flow opening 72 on an opposite side 74 of the unit 16. The power actuated valve 18 may be mounted a face 76 of the unit 14 and communicate with the conduit.

Figure 7:
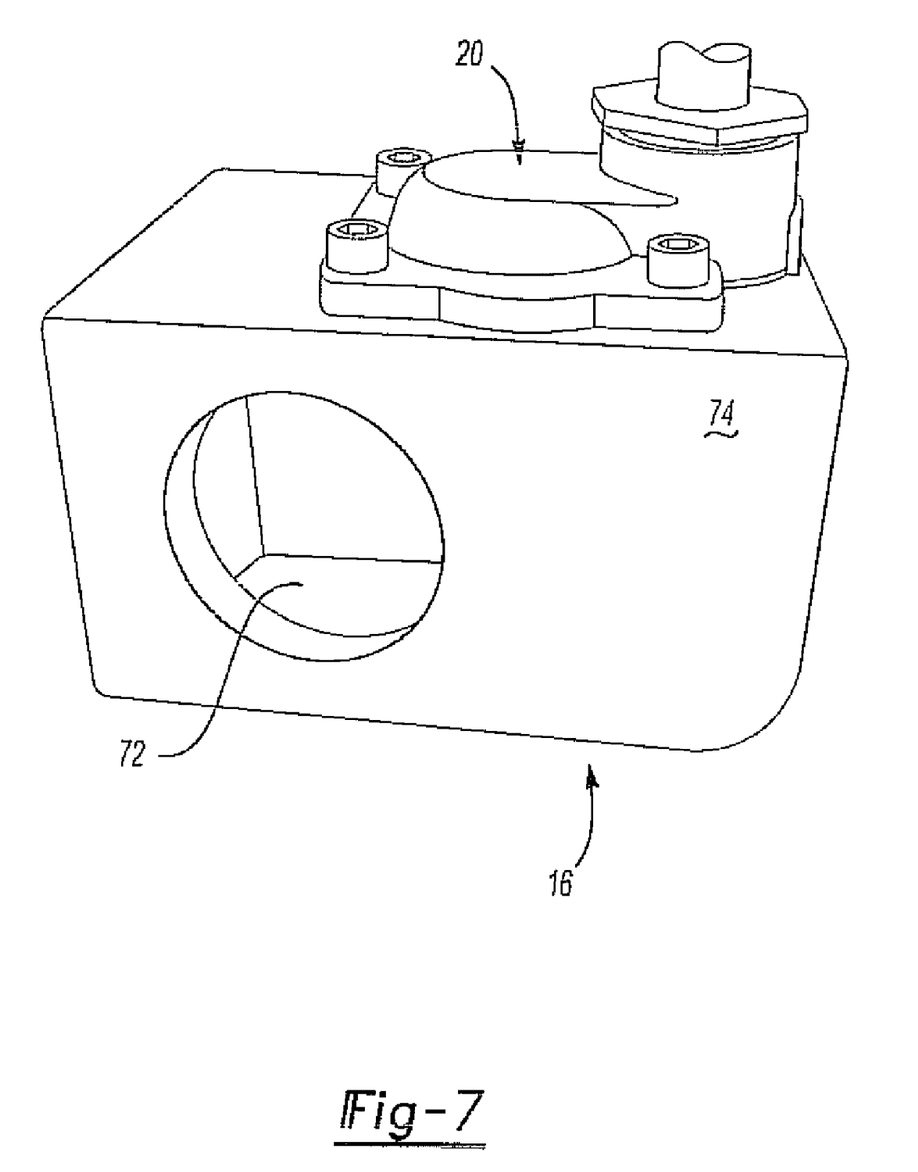
FIG. 7 is a perspective side view of a normally closed valve unit.

As best shown in FIGS. 5 through 7, the water intake opening 68 of the valve unit 16 may include a male connector 78 having a plurality of tongues 80. As such, it will be appreciated that the male connector 78 of the valve unit 14 may be removably fitted to the female connector 66 of the normally open valve unit 14. The opening 72 of the valve unit 16 may be threaded or include a fitting or connector such that a hose or the like may have connected valve unit 16 at the opening 72. For example, as mentioned above a conduit or hose extending from the apparatus 10 to the mixer drum of the mixer truck 100 may be attached to the apparatus 10 at the opening 72.

Referring now to FIGS. 1 through 7, in operation, a user should first be assured that the flowmeter unit 12 of the apparatus 10 is connected to a source of water at the opening water intake opening (not shown) the side 26 of the unit 12. The user should also connect a conduit to the opening 72 of the normally closed valve unit 16. Then, once connected, a user may trigger the toggle switch 44 of the switching device 24. Upon activation of the switch 44, the control unit 22 may command the valve 16 of the normally open valve unit 14 (if present) to close off flow to the second water out flow opening 56 and command the valve 18 of the normally closed valve unit to open—causing water to flow through the water out flow opening 72. As discussed above, the volume of water flowing through the apparatus may be measured by the flowmeter 32 and may be indicated on the display 46 of the switching device 26.

In additionally, the radio transmitter 29 of the control 22 may to transmit a signal to a remote location indicating that the valve 20 of the normally closed valve unit 16 has been opened. More specifically, when used in connection with a commercial mixing vehicle, a signal may be transmitted to indicate that an operator had commenced filling the mixing drum 27 with water. Further, the control unit 22 may transmit a second signal upon detection of fluid/water flowing through the flowmeter 32 when the normally closed valve 20 is in a closed position. Specifically, such a state would indicate that an operator of the mixing vehicle had completed a job and was now using water to clean off his or her vehicle using the nozzle 28.

Having thus described my invention, various additional improvement and embodiments will become know to those of skill in the art that to not depart from the scope of the appended claims.

I claim:

1. A water control apparatus in combination with a mixing vehicle, the combination comprising:
    a mixing vehicle having an onboard water source and a rotating mixing drum; and
    a water control apparatus mounted on the mixing vehicle having;
        a flowmeter unit including a fluid inlet and a fluid outlet, the fluid inlet being in fluid communication with the water source;
        a normally closed valve unit having a fluid inlet, a fluid outlet, and a normally closed power actuated valve, the fluid outlet of the normally closed valve unit being in fluid communication with the mixing drum, the fluid inlet of the normally closed valve unit including a connector engaging the fluid outlet of the flowmeter unit and removably securing the normally closed valve unit to the flowmeter unit
        a control unit in communication with and operable to monitor the operation of the flowmeter unit and the normally closed power actuated valve; and
        a switching device in communication with the control unit, activation of the switching device causing the normally closed power actuated valve to open and control water flow from the water source, through the flowmeter unit and the normally closed valve unit and into the mixing drum.

2. The water control apparatus of claim 1, wherein the normally closed power actuated valve is solenoid controlled valve.

3. The water control apparatus of claim 1, wherein the mixing vehicle includes a cabin and the switching device is mounted in the cabin.

4. The water control apparatus of claim 3, wherein the switching device comprises a toggle switch and a display, the display operating to indicate the volume of water flowing through the flowmeter.

5. The water control apparatus of claim 1, wherein the control unit further comprises a global positioning system receiver.

6. The water control apparatus of claim 1, wherein the control unit further comprises a slump additive calculator operating to cause the control unit to automatically open, close or refrain from opening, the normally closed power actuated valve so that a cement mix in the mixing drum is maintained at predetermined water-cement ratio.

7. The water control apparatus of claim 1, wherein the control unit further comprises a radio transmitter operable to transmit a signal to a remote station upon opening of the normally closed valve.

8. The water control apparatus of claim 1, further comprising a normally open valve unit secured to the flowmeter unit, the normally open valve unit having a fluid inlet, a fluid outlet, and a normally open power actuated valve.

9. The water control apparatus of claim 1, further comprising a hose connected to the normally open valve unit.

10. A water control apparatus in combination with a mixing vehicle, the combination comprising:
    a mixing vehicle having an onboard water source and a rotating mixing drum; and
    a water control apparatus mounted on the mixing vehicle having;
        a flowmeter unit having a fluid inlet and a fluid outlet, the fluid inlet being in fluid communication with the water source;
        a normally open valve unit having a fluid inlet, a fluid outlet, and a normally open power actuated valve, the fluid inlet of the normally open valve unit including a connector engaging the fluid outlet of the flowmeter unit and removably securing the normally open valve unit to the flowmeter unit;
        a normally closed valve unit having a fluid inlet, a fluid outlet, and a normally closed power actuated valve, the fluid outlet of the normally closed valve unit being in fluid communication with the mixing drum, the fluid inlet of the normally closed valve unit including a connector engaging the fluid outlet of the normally open valve unit and removably securing the normally closed valve unit to the normally open valve unit;
        a control unit in communication with and operable to monitor the operation of the flowmeter unit, the normally open power actuated valve, and the normally closed power actuated valve; and
        a switching device in communication with the control unit, activation of the switching device causing the normally closed power actuated valve to open, the normally open power actuated valve unit to close, and control water flow from the water source, through the flowmeter unit and the valve units and into the mixing drum.

11. The water control apparatus of claim 10, wherein the power actuated valves are each solenoid controlled valves.

12. The water control apparatus of claim 10, wherein the mixing vehicle includes a cabin and the switching device is mounted in the cabin.

13. The water control apparatus of claim 12 wherein the switching device comprises a toggle switch and a display, the display operating to indicate the volume of water flowing through the flowmeter.

14. The water control apparatus of claim 10, wherein the control unit further comprises a global positioning system receiver.

15. The water control apparatus of claim 10, wherein the control unit further comprises a slump additive calculator operating to cause the control unit to automatically open, close or refrain from opening, at least one of the power actuated valves so that a cement mix in the mixing drum is maintained at predetermined water-cement ratio.

16. The water control apparatus of claim 10, wherein the control unit further comprises a radio transmitter operable to transmit a signal to a remote station upon the actuation of at least one of the power actuated valves.

17. The water control apparatus of claim 10, further comprising a hose connected to the normally open valve unit.

* * * * *